Aug. 13, 1929. M. MONCREIFFE 1,724,300
MOWER
Filed Feb. 5, 1923 6 Sheets-Sheet 3

Inventor:
Malcolm Moncreiffe,
By Fisher, Fowle, Clapp & Soans
Attys.

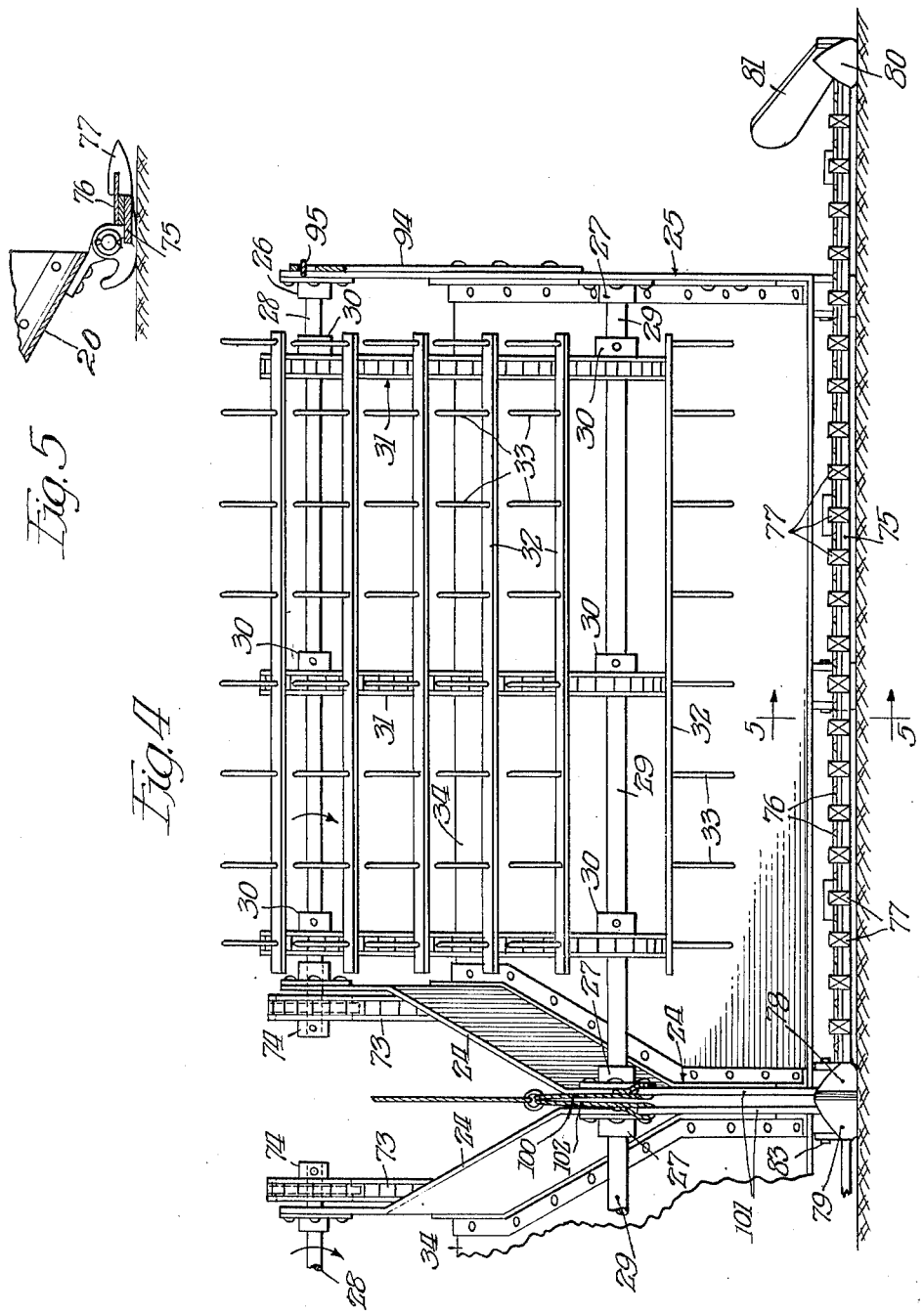

Aug. 13, 1929. M. MONCREIFFE 1,724,300
MOWER
Filed Feb. 5, 1923 6 Sheets-Sheet 5
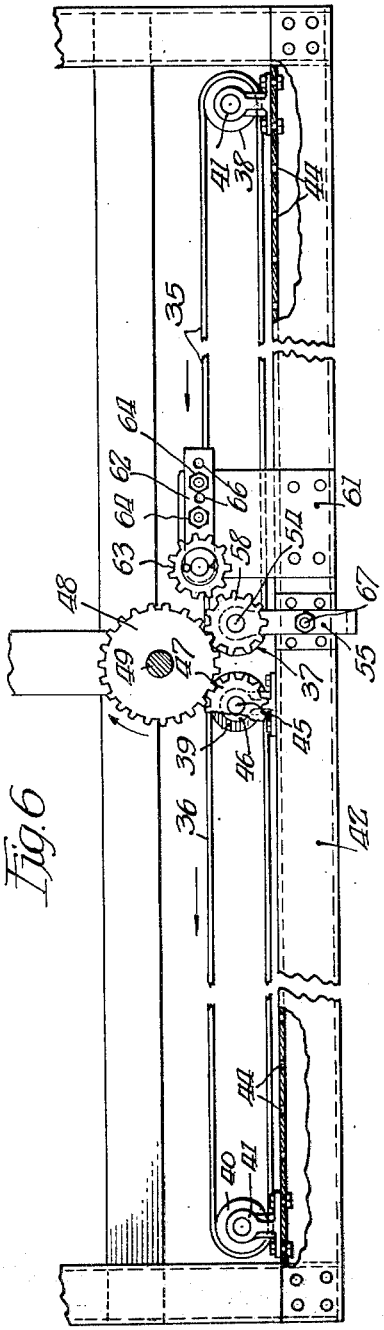
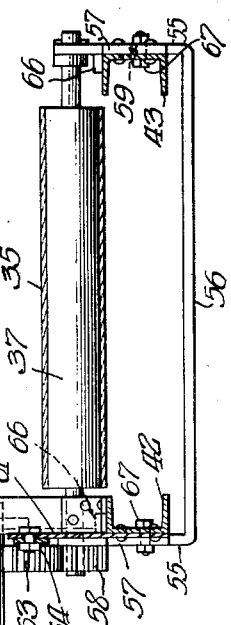
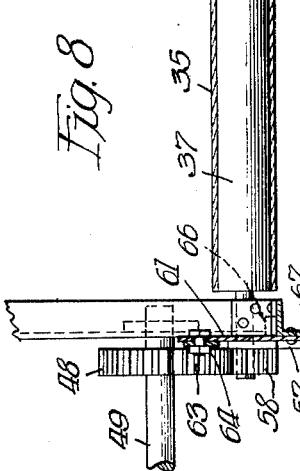
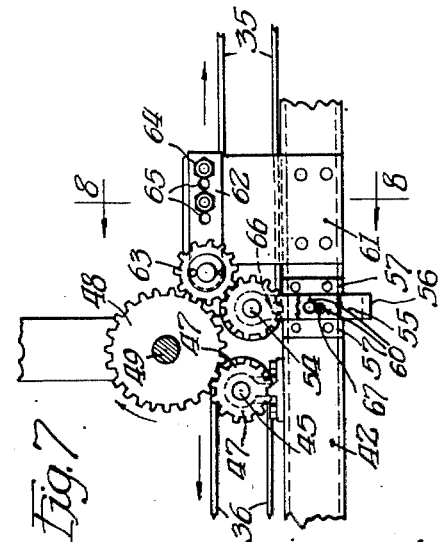
Inventor:
Malcolm Moncreiffe
By Fisher, Fowle, Clapp & Soans.
Attys.

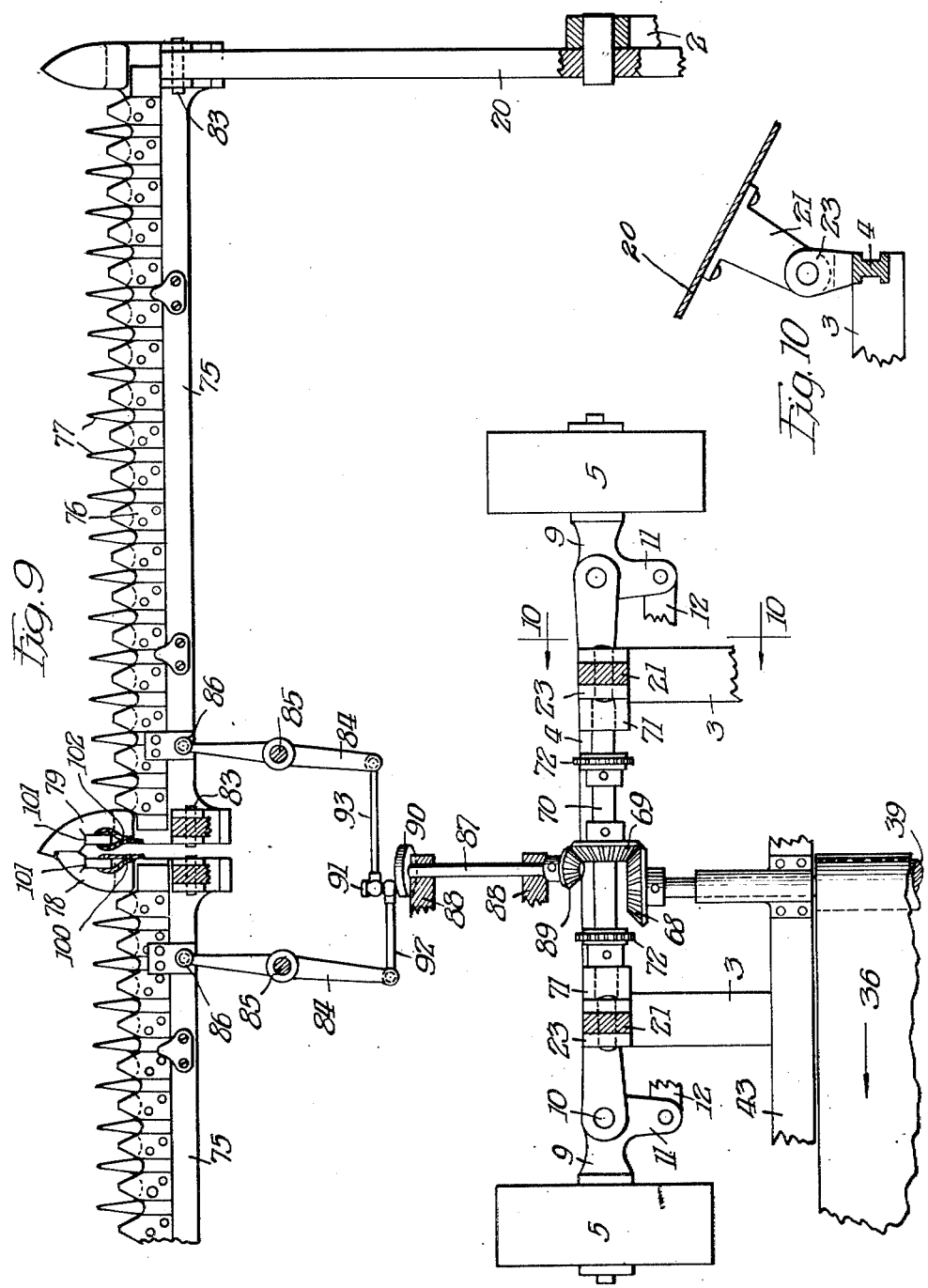

Patented Aug. 13, 1929.

1,724,300

UNITED STATES PATENT OFFICE.

MALCOLM MONCREIFFE, OF BIG HORN, WYOMING.

MOWER.

Application filed February 5, 1923. Serial No. 616,883.

My invention has reference more particularly to a mower which has the cutting mechanism arranged across the front of the machine, and is adapted to collect the material from the cutting mechanism and deposit same at the side of the machine.

The principal objects of my invention are to arrange the cutting mechanism across the front instead of at the side of the machine; to position the cutting mechanism ahead of the supporting and propelling means to avoid injury or packing down of the material before it is cut; to provide a mower which is pushed or propelled from the rear; to regulate the direction of movement of the mower by a steering mechanism under the control of the operator; to collect the material from the cutting mechanism and discharge same at either or both sides of the machine; to provide a machine which is capable of cutting a wider swath than in former machines; and in general, to provide an improved mowing machine of greater efficiency and more conveniently operated than moving machines which have been heretofore provided.

Figure 1:
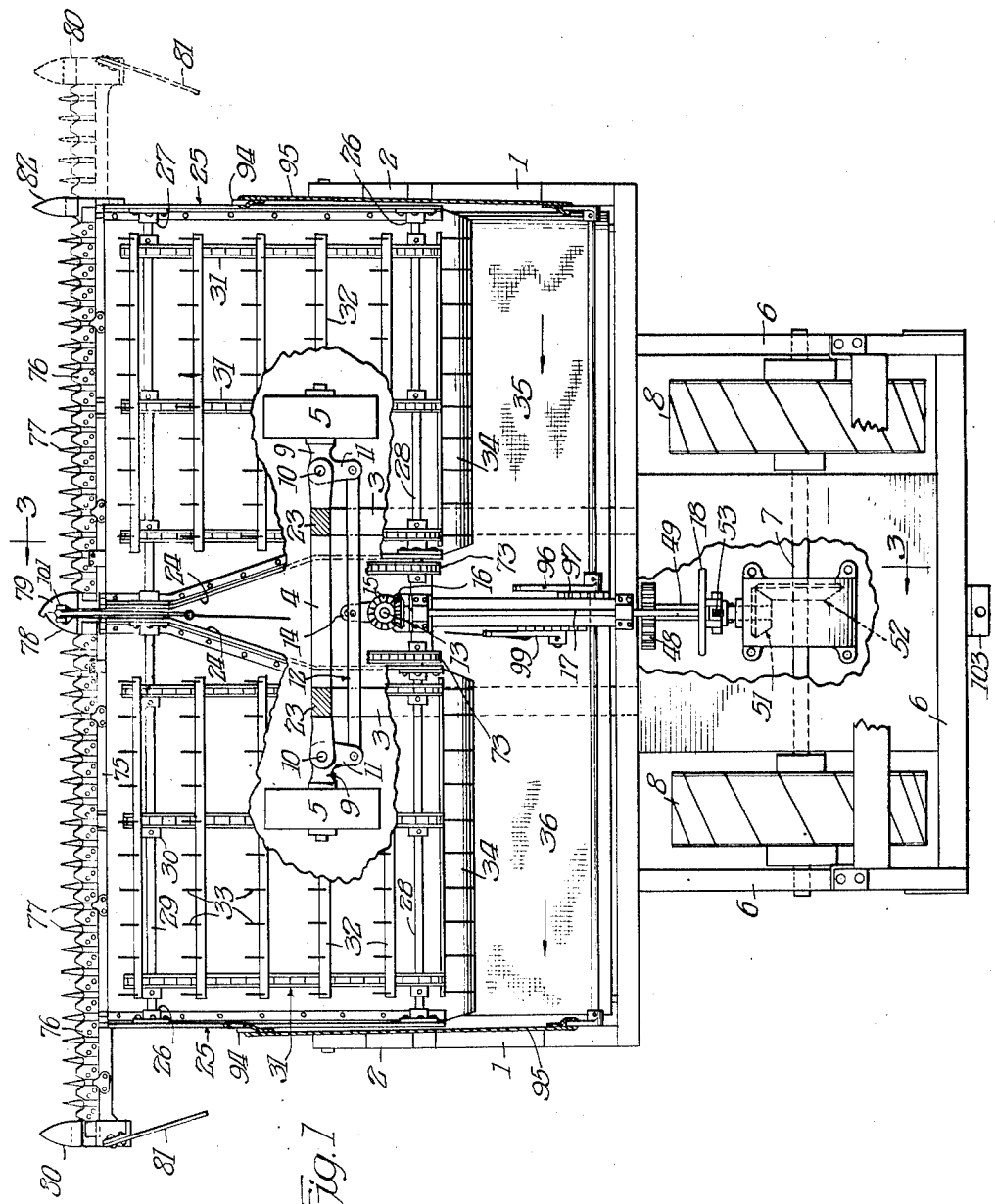
Figure 2:
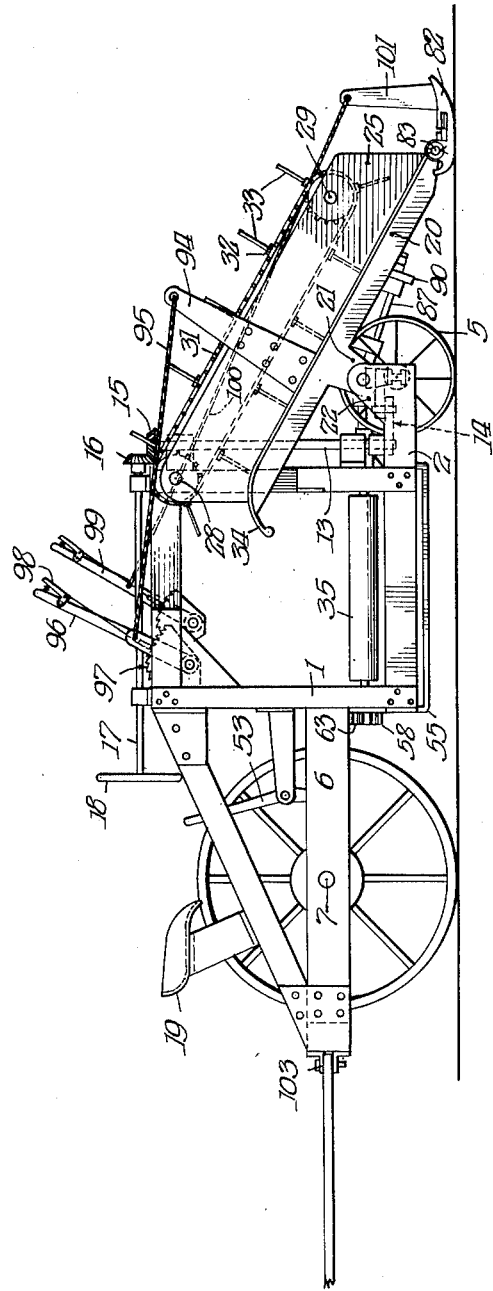
Figure 3:
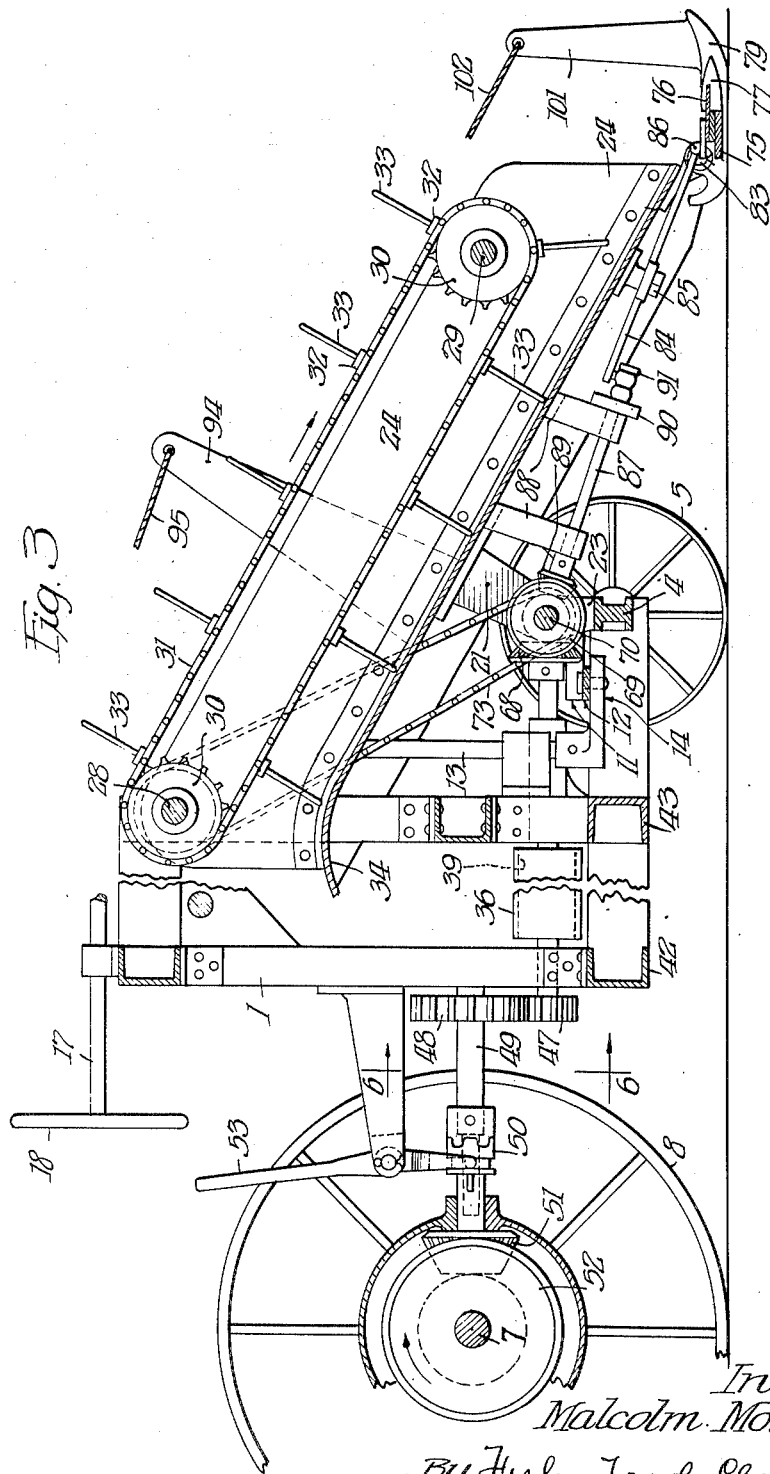

On the drawings:

Fig. 1 is a top view of a mower constructed in accordance with my invention and having parts broken away to disclose details of construction;

Fig. 2 a side view of the mower;

Fig. 3 an enlarged sectional view on the line 3—3 of Fig. 1;

Fig. 4 a front view of substantially one-half of the machine;

Fig. 5 a sectional view on the line 5—5 of Fig. 4;

Fig. 6 a sectional view on the line 6—6 of Fig. 3, showing the side delivery mechanism arranged to discharge at one side of the machine;

Fig. 7 a fragmentary view of the structure shown in Fig. 6, showing the driving mechanism for the side delivery mechanism arranged for operating the latter to discharge at both sides of the machine;

Fig. 8 a sectional view on the line 8—8 of Fig. 7;

Fig. 9 a detail view showing the driving mechanism for the cutters; and

Fig. 10 a detail view on the line 10—10 of Fig. 9.

Referring to the drawings, the numeral 1 indicates a transversely elongated rectangular frame which is provided at each end with forwardly projecting members 2 and intermediate of the ends with a pair of similar, spaced members 3, which latter are connected to an axle 4, upon the opposite ends of which the front supporting wheels 5 are mounted. A frame 6 extends rearwardly from the frame 1 and has an axle 7 journaled to rotate therein and provided with a pair of wide faced supporting wheels 8 which are secured onto the axle 7 so that the latter is caused to rotate as the machine is propelled along the ground.

The front wheels 5 are operable to control the direction of movement of the mower, and to this end are carried on brackets 9 which are vertically pivoted as at 10—10 to the opposite ends of the axle 4, and each bracket 9 is constructed with an arm 11 which is connected to a cross link 12 so that the wheels 5 swing in unison on their vertical axes. An upright shaft 13 is journaled at the front of the frame 1 and has a crank 14 at the lower end connected to the link 12, and a bevel gear 15 on the upper end of this shaft meshes with the bevel gear 16 on the shaft 17, which is journaled on the top of the frame 1, and has a steering wheel 18 at the rear end conveniently positioned for operation by an operator in the seat 19, which latter is mounted on the rear frame 6.

Mounted at the front of the frame 1 are a pair of forwardly and downwardly inclined conveyor bottoms 20, each of which is of a width substantially equal to one-half the length of the frame 1, and each of these conveyer bottoms is provided at opposite sides with depending brackets 21 which are pivoted on corresponding upwardly extending brackets 22 and 23 on the extensions 2 and 3 respectively of the frame 1, the conveyor bottom 20 at the right hand side of the machine being carried by the extensions 2 and 3 at that side of the machine, and the conveyor bottom 20 at the left hand side of the machine being carried by the extensions 2 and 3 at the left hand side of the machine, so that the two conveyor bottoms 20 are adapted to swing independently on their pivotal mounting. These conveyor bottoms have inner and outer side walls 24 and 25 respectively with bearings 26 and 27 at their upper and lower ends in which the upper and lower shafts 28 and 29 respectively are journaled. Each shaft has a number of spaced sprockets 30 fixed thereon, around which are passed the chains 31 which are connected by slats 32 having fingers 33 arranged at intervals thereon to form a conveyor for carrying material upwardly on the conveyer bottoms 20.

The upper ends of the conveyor bottoms 20 are bent downwardly as indicated at 34 to discharge onto a cross conveyer which is mounted in the frame 1. This conveyer comprises two sections extending from the middle of the frame 1 to the opposite ends respectively thereof and each comprises a wide belt, one of which is indicated at 35 and the other at 36, which are carried by inner and outer rollers, those for the belt 35 being indicated at 37 and 38 and those for the belt 36 being indicated at 39 and 40. The rollers 38 and 40 are journaled in any suitable manner in bearing brackets 41 at opposite sides of the frame 1 to the bottom side rails 42—43 of the latter, these rails being provided with a plurality of spaced bolt holes 44 at the outer ends so that the brackets 41 may be adjusted to vary the position of the discharge ends of the conveyer belts 35 and 36. The roller 39 is fixed on the shaft 45 which is journaled in a pair of brackets 46 which are secured in a fixed position on the cross members 42—43, and said shaft has a spur gear 47 on the rear end meshing with the spur gear 48 on the shaft 49. This shaft 49 is connected through a clutch 50 with a bevel pinion 51 which meshes with a bevel gear 52 on the shaft 7 so that power may be communicated to the roller 39 from the rear axle 7 for operating the conveyer belt 36 as the machine is propelled. The clutch 50 is controlled by a lever 53 adjacent the driver's seat 19 so that the driving connection between the pinion 51 and shaft 49 may be interrupted when desired.

The roller 37 is located close to the roller 39 so that there is only a narrow gap between the inner ends of the two conveyer sections, and the shaft 54 which carries the roller 37 is journaled in the upright arms 55 of the yoke 56 which extends from front to rear of the frame 1, said arms 55 being interposed between guides 57 so that the shaft 54 and roller 37 may be raised and lowered as required. A spur gear 58 is fixed on the end of the shaft 54 and adapted to mesh with the spur gear 48 when the yoke 56 is in the elevated position and to be withdrawn from engagement therewith when the yoke is in the lowermost position. Each of the arms 55 is provided with bolt holes 59 and the frame members 42 and 43 with a pair of vertically spaced bolt holes 60 as shown in Fig. 7, to receive the bolts for holding the yoke 56, shaft 54 and roller 37 in either of the two positions of adjustment. When the yoke 56 is in an elevated position and the spur gear 58 in mesh with the spur gear 48, both of the conveyers operate in the same direction as shown by the arrows in Fig. 6, so that material deposited thereon is conveyed toward the left and discharged at the left hand side of the machine, the distance between the rollers 37 and 39 being so short that material from the right hand conveyer 35 is readily passed onto the left hand conveyer 36 between the adjoining ends thereof.

Mounted on the rear frame member 42 adjacent the spur gear 48 is a plate or bracket 61 which carries a bearing member 62 at the upper end on which the spur gear 63 is mounted. The bearing member 62 is connected to the bracket 61 by bolts 64, and has two sets of bolt holes 65 and 66 which enable the bearing member 62 to be adjusted to the position shown in Fig. 7, wherein the spur gear 63 meshes with the spur gear 48 or to be withdrawn from such engagement to the position shown in Fig. 6, out of engagement therewith. In view of this construction and the adjustable mounting of the roller shaft 54, the right hand conveyer belt 35 may be operated in the direction shown by the arrow in Fig. 6, or in the reverse direction as shown by the arrow in Fig. 7. To operate the conveyer in the direction shown in Fig. 6, the spur gear 63 is withdrawn from engagement with the spur gear 48 and the yoke 56 elevated so that the spur gear 58 meshes directly with the spur gear 48. To reverse the operation of the right hand conveyer belt 35, the yoke 56 is lowered to the extent permitted by the stop pins 66 and secured in such position by the bolts 67 and the bracket 61 is adjusted so that the spur gear 63 meshes with the spur gear 48, in which position it also meshes with the spur gear 58 and thus reverses the direction of movement of the latter spur gear and operates the right hand conveyer 35 in a direction opposite to that of the left hand conveyer belt 36 so that material deposited on the belts 35—36 is discharged at both sides of the machine.

The shaft 45 of the roller 39 projects forwardly beyond the frame 1 as shown in Fig. 9, and has a bevel gear 68 on the forward end meshing with the bevel gear 69 on a shaft 70 which is journaled between the wheels 5 in bearing 71 with which the conveyor bottom supporting brackets 23 are provided, said bearings being in alignment with the pivotal axes of the conveyor bottoms 20. A pair of sprockets 72 are fixed on the shaft 70 and connected by the chains 73 with sprockets 74 on shafts 28 which carry the upper sprockets 30, around which the conveyer chains 31 are passed for operating the conveyors so as to elevate material along the conveyor bottoms 20.

A separate cutter guide 75 is pivoted as at 83—83 to the lower end of each conveyor bottom 20, and each has a sickle bar 76 of the usual form mounted therein to reciprocate. These guides 75 are provided in the usual manner with a plurality of spaced shoe like tooth members 77 and have enlarged supporting shoes at the ends. The shoes at the inner ends of the cutter guides, which are indicated at 78 and 79 respectively, are arranged close together and preferably formed as shown in Fig. 9, with the point of the shoe 79 projecting forwardly beyond and across the end of the shoe 78, so as to serve as an effective divider for separating the swaths to be cut by the respective cutter sections.

If the machine is arranged to discharge at both sides, the cutters may both project beyond the sides of the machine as shown by full lines at the right of Fig. 1 and by dotted lines at the left of said fig., and the outer end shoes 80 are both provided with deflectors 81 to throw the hay or grain cut by the outer ends of the cutters inwardly toward the machine. If, however, the machine is to deliver only at one side, as for example at the left hand side of the machine as shown in Fig. 1, the left hand cutter projects beyond the side of the machine as shown, whereas the right hand cutter terminates at the right hand side of the machine as shown in full lines in said fig., and the outer end shoe of the right hand cutter may be smaller as shown at 82 and have the deflector omitted.

For reciprocating the sickle bars 76 in the guides 75, the former are connected respectively to the forward ends of a pair of levers 84 which are pivoted intermediate of their ends at 85 to the corresponding conveyor bottom 20, the connections between the ends of the levers 84 and the sickle bars 76 being effected by ball and socket joints 86 to permit the necessary pivotal movement for operating the sickle bars and also to permit a slight tilting of the cutters on their pivots 83—83. A shaft 87 is journaled in bearings 88 on one of the conveyor bottoms 20, as for example, the left hand conveyor bottom, as indicated in Fig. 9, and has a bevel pinion 89 at the upper end meshing with the bevel gear 69. Secured on the lower end of this shaft 87 between the upper ends of the levers 84 is a disc 90 having an eccentric or crank pin 91 which is connected by the links 92 and 93 to the upper ends of the levers 84. These links 92 and 93 are preferably connected with the pin 91 and with the levers 84 by means of ball and socket joints which afford the necessary universal action to permit relative movement of the conveyor bottoms 20.

The conveyors are adjustable on their pivotal supports 21, 22, and 23, and to this end each has a rigid upstanding arm 94 which is connected by a cable 95 to a hand lever 96 within convenient reach of the operator, this hand lever being provided with the usual ratchet pawl co-operating with the segment 97 and controlled by the grip lever 98 for adjusting the inclination of the conveyors.

The cutter guides 75 are also adapted for adjustment on their pivots 83 by means of a similar adjusting lever 99 which is connected by the cable 100 to upwardly extending arms 101 on the shoes 78 and 79. Inasmuch as the cutter guides 75 may rock unevenly on account of conditions in the surfaces of the ground over which they travel, the cable 100 is preferably divided at a short distance from the arm 101 and the extensions 102 of the cable connected respectively to the arms 101 so as to permit relative movement thereof.

In the operation of this machine the propelling means is applied to the rear end of the mower as indicated at 103 and the direction of movement is controlled by means of the steering wheel 18 and the conveyor members are adjusted by the hand lever 96 so that the cutting mechanism is positioned to cut as close to the ground as desired. The inclination of the cutters on the pivots 83 is also regulated by the hand lever 99 so that the cutting mechanism has the proper pitch to clear or pass over irregularities on the surface of the ground, and as the material is cut, the conveyors 31—32—33 carry the cut material up the conveyor bottoms 20 and deposit it on the conveyors 35—36 which discharge at one side or both sides of the machine as desired.

If a short cutter section is used at one side of the machine as shown by the full lines at the right hand side of Fig. 1 and the conveyers 35—36 are operated to discharge at both sides of the machine, it may be preferable to shorten up the conveyer 35 which may be readily done by setting the brackets 41 at that side of the machine away from the end of the frame 1, the bolt holes 44 being provided for this purpose, and shortening the belt 35 accordingly.

It is to be noted that with this construction the two drag sections as well as the two cutters are free to swing independently to accommodate irregularities of the surface of the ground at the two sides of the machine, thereby avoiding the strain which would be imposed upon the machine and particularly the cutting mechanism if the separate movement were not provided, and, moreover, with this construction, two comparatively long cutter sections may be readily employed and a much wider swath cut than with mowers such as are available at the present time.

While I have shown and described my invention in a preferred form, I am aware that various changes and modifications may be made without departing from the principles of my invention, the scope of which is to be determined by the appended claims.

I claim as my invention:

1. In a device of the class described, the combination of a main frame having front and rear pairs of supporting wheels, one pair of which is operable to control the direction of movement of the device, a conveyor frame pivotally mounted on said main frame and having means operable to convey material towards the rear of the device, means for adjusting the front end of the conveyor about the pivotal mounting of the conveyor, a cutter in front of said conveyor and connected at its rear portion to said conveyor so that the front of the cutter is adjustable in a vertical direction, means for effecting said adjustment of said cutter, a discharge conveyor extending transversely of said first mentioned conveyor and mounted on said main frame intermediate said front and rear pairs of wheels and adapted to receive material from said first mentioned conveyor and to discharge such material to one side of the device, and means operative throughout the entire range of adjusted relative positions of said conveyors and cutter for actuating same, the latter means being operable as an incident to forward movement of the device.

2. In a device of the class described, the combination of a frame having front and rear pairs of supporting wheels, one pair of which is operable to control the direction of movement of the device, a conveyor extending longitudinally of said frame and pivotally mounted intermediate its ends on said frame, means for adjusting the position of the conveyor about its pivotal mounting, thereby to effect vertical adjustment of the front end of the conveyor a cutter adjustably secured to the front end of said conveyor for cutting grain or the like as the device is moved forwardly, the means for securing said cutter to said conveyor permitting the cutter to accommodate itself to unevenness of the ground over which it is moved, and means for effecting adjustment of said cutter relative to said conveyor.

3. In a mower of the class described, the combination of a frame, front and rear pairs of supporting wheels on which the frame is mounted so as to be portable, a conveyor mounted on said frame intermediate said pairs of wheels and extending in a direction transverse to the length of the mower, a second conveyor extending longitudinally of the mower, pivotally mounted on said frame so as to be adjustable relative thereto, and having its front end normally disposed adjacent the ground in front of said front wheels, its rear end being disposed at an elevation from the ground and adjacent said transversely extending conveyor, means for operating said cutter and both of said conveyors, and means for adjusting said longitudinally extending conveyor on its pivot.

4. In a device of the class described, the combination of a main supporting frame having front and rear supporting wheels mounted thereon adjacent its front and rear ends respectively, a conveyor extending crosswise of said main frame and mounted thereon intermediate said front and rear supporting wheels, a second conveyor having its rear end disposed over a part of said crosswise conveyor and extending forwardly therefrom to a point in advance of said front supporting wheels, said conveyor being pivotally mounted on the frame so as to permit vertical adjustment of the front end of the conveyor, a cutter extending across the front end of said second conveyor and adjustably connected to the front end thereof, mechanism for actuating said conveyor and cutter as an incident to rotation of one of said supporting wheels, an operator's seat mounted on said main frame adjacent the rear of said crosswise conveyor, and controls adjacent said seat for facilitating adjustment of said adjustable parts.

5. In a device of the class described, the combination of a main supporting frame having front and rear supporting wheels mounted thereon adjacent its front and rear ends respectively, a conveyor extending crosswise of said main frame and mounted thereon intermediate said front and rear supporting wheels, a second conveyor having its rear end disposed over a part of said crosswise conveyor and extending forwardly therefrom to a point in advance of said front supporting wheels, said conveyor being pivotally mounted on the frame so as to permit vertical adjustment of the front end of the conveyor, a cutter extending across the front end of said second conveyor and adjustably connected to the front end thereof, and mechanism for actuating said conveyor and cutter as an incident to rotation of one of said supporting wheels.

6. In a device of the class described, the combination of a main frame, front and rear wheels mounted on said frame adjacent the front and rear ends thereof, a conveyor extending crosswise of said frame and mounted thereon intermediate said front and rear wheels, a pair of longitudinally extending conveyors mounted side by side on said main frame with their front ends in advance of said front wheels and their rear ends above said crosswise conveyor, said pair of longitudinally extending conveyors being so mounted as to permit vertical adjustment of the front ends thereof, means for effecting such adjustment of said conveyors, independent cutter units adjustably mounted respectively on the front ends of said pair of conveyors, said cutters being provided with ground engaging shoes at their extremities for guiding the cutters over the ground at a predetermined elevation therefrom, and means for effecting vertical adjustment of said cutter units relatively to the front ends of the conveyors.

7. In a device of the class described, the combination of a main frame, front and rear wheels mounted on said frame adjacent the front and rear ends thereof, a conveyor extending crosswise of said frame and mounted thereon intermediate said front and rear wheels, a pair of longitudinally extending conveyors mounted side by side on said main frame with their front ends in advance of said front wheels and their rear ends above said crosswise conveyor, said pair of longitudinally extending conveyors being so mounted as to permit vertical adjustment of the front ends thereof, means for effecting such adjustment of said conveyors, independent cutter units adjustably mounted respectively on the front ends of said pair of conveyors, said cutters being provided with ground engaging shoes at their extremities for guiding the cutters over the ground at a predetermined elevation therefrom, the adjacent ends of said cutters having shoes adapted to coact with each other to serve as a divider for separating the swaths to be cut by the respective cutter sections, and means for effecting vertical adjustment of said cutter units relatively to the front ends of the conveyors.

MALCOLM MONCREIFFE.